United States Patent

Shirn et al.

[15] 3,686,473

[45] Aug. 22, 1972

[54] HEATED REAR-VIEW MIRROR

[72] Inventors: George A. Shirn, Williamstown, Mass.; James B. Lazott, Bedford, N.H.

[73] Assignee: Sprague Electric Company, North Adams, Mass.

[22] Filed: March 25, 1971

[21] Appl. No.: 127,898

[52] U.S. Cl. .....................219/219, 219/202, 350/61
[51] Int. Cl. ..............................................H05b 1/00
[58] Field of Search.....................219/200–203, 219, 219/543; 350/61, 68

[56] References Cited

UNITED STATES PATENTS 2,564,836   8/1951   Elsenheimer..............219/219

FOREIGN PATENTS OR APPLICATIONS 1,189,667   3/1965   Germany...................219/219

Primary Examiner—C. L. Albritton
Attorney—Connolly and Hutz and Vincent H. Sweeney

[57] ABSTRACT

A heated rear-view mirror for use on the exterior of automotive vehicles is fabricated by sputtering or evaporating a Nichrome V resistance film onto a glass surface and electrically connecting the film to an automotive battery, so that when the ignition switch is turned on, the current from the automotive battery heats the resistance film enough to defrost the outside mirror. A thermostat may be used in the above system so that the mirror is heated only when necessary. The Nichrome V film serves two main purposes, first, as a heating source and second, as a low-glare mirrored surface for the system.

8 Claims, 4 Drawing Figures

HEATED REAR-VIEW MIRROR

BACKGROUND OF THE INVENTION

This invention relates to a heated rear-view mirror, and more particularly to a low-glare (reduced reflectivity) mirror to be used on the outside of an automotive vehicle that can be heated so as to cause a defrosting effect on the mirror surface.

The application of electroconductive films or coatings upon glass and similar substances is well known in the art. The films or coatings have been deposited on glass so that an electric potential may be applied across the coating producing heat thereon. The prior art uses of these techniques have been primarily for windshields and the like, which involved using glass and transparent films or coatings.

No satisfactory method of fabricating glass surfaces having a mirror film on one side thereof that can be heated for use on automotive vehicles has yet been found. Various problems have been confronted in attempts to produce such a unit. Some of these problems include the inability to produce a film with the proper impedance for an automotive system without having to cut or etch a meandering path thereon, but to have a film with sufficient reflectivity to act as a rear-view mirror. It is also a problem to produce a unit that has a rather even distribution of heat over the entire mirrored surface. And since such a mirror will be needed only in cold weather, it is desirable that such a device have the capability to thermostatically switch on and off.

Accordingly, it is an object of the present invention to provide an exterior rear-view mirror, such as the type used in automotive vehicles, that can be heated to provide a defrosting effect for the glass surface while retaining a sufficient amount of reflectivity for use as a mirror.

It is a further object to provide a thermostatic control for such a mirror.

It is a still further object to provide a low-glare, but sufficiently reflective, mirror that can be "defrosted" and possess a relatively even distribution of heat throughout the surface of the mirror.

SUMMARY OF THE INVENTION

Broadly, this invention presents the combination of a non-conducting base, with a resistance element that is reflective in nature, and that is capable of providing an even dissipation or distribution of heat over the entire mirrored surface when in electrical connection with a power source.

A glass surface has a Nichrome V resistance film evaporated or sputtered thereon, and is in electrical contact with a 6 volt or 12 volt power source such as an automotive battery. Approximately 20-35 watts is obtained with a resistance of about 4-6 ohms on the film with a 12 volt battery. A film thickness of about 300-400 A is sufficient for the purposes of this invention. A 6 volt power supply necessitates a proportionately thicker resistance film to produce sufficient heat to act as a "defrosting" surface—approximately four times as thick.

The electrical contact should be such that when the mirror system is used in an automotive vehicle, the mirror will heat up whenever the ignition is "on". Also, the use of a thermostat may be desirable since such a mirror is needed only in colder weather. The mirror will only be heated when the temperature is below about 10° C and when the ignition is on.

The Nichrome V used as the resistance film offers the advantage of providing the necessary heat, while giving a sufficiently reflective mirror that has a low-glare factor, that is, reduced reflectivity. And in the case of round mirrors, the resistance film should be applied in a radially graded fashion so that the film is thicker in the middle of the mirror, because there will be a higher current density in the middle, and there is need for a more even distribution of heat.

BRIEF DESCRIPTION OF THE DRAWINGS

FIG. 3 shows a mirror of circular configuration having a radially graded resistance film 19 and copper contact areas 18 and 18a.

DESCRIPTION OF THE PREFERRED EMBODIMENTS

Figure 1:
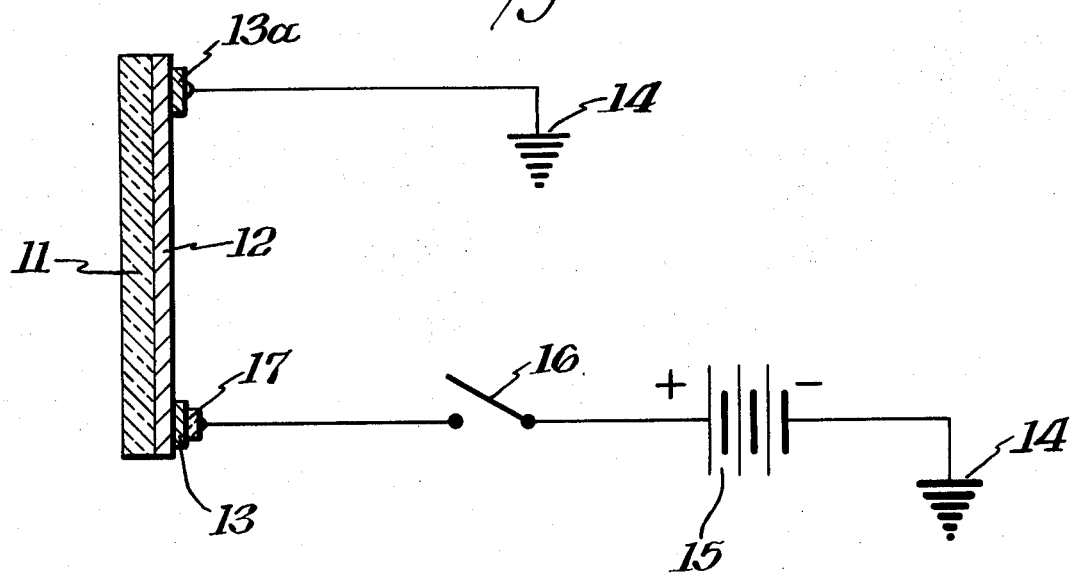
FIG. 1 shows a schematic diagram of an embodiment of the present invention.

A low-glare, reflective resistance element 12, in FIG. 1, is evaporated or sputtered onto a glass surface 11 or other non-conducting base covering at least one side thereof so as to produce a mirrored device having a low total resistance. The reflective resistance film 12 is contacted by two conducting epoxy mounts 13 and 13a; to one mount 13a is attached a ground 14, and to the mount 13 is attached a positive temperature coefficient of resistivity (PTCR) ceramic 17 (acting as a thermostat) that is in electrical connection with an automotive battery 15 through the ignition switch 16. The mirrored surface has a reduced reflectivity that is approximately 10 percent less reflective than aluminum.

The resistance film used herein should possess certain advantageous characteristics, such as sufficient reflectivity to serve as a mirror, but not be so reflective that it produces too much glare. It should be capable of receiving reinforcing layers or contacts, and of adhering to the non-conducting base when such other layers are applied thereto. And it should be capable of providing a proper impedance for a 6 or 12 volt automotive power system without having to cut or etch a meandering path on the resistance film. Nichrome V possesses these desirable characteristics and is the preferred resistance film within the scope of this invention. Nichrome V is the trademark for an alloy that is composed of 80 percent nickel and 20 percent chromium. Other metals that give similar, although less desirable, characteristics include aluminum, chromium, nickel, rhodium, iron and mixtures and combinations thereof, and may be used as the resistance film. As noted earlier, the reflective resistance film may be sputtered or evaporated onto the non-conducting surface, or may be otherwise deposited thereon in any suitable and convenient manner.

Figure 2:
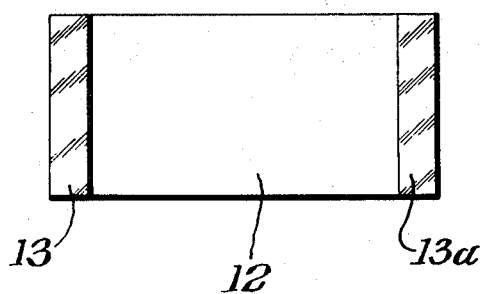
FIG. 2 shows the back portion of a mirror 12, within the scope of the present invention, having conducting epoxy mounts 13 thereon.
Figure 3:
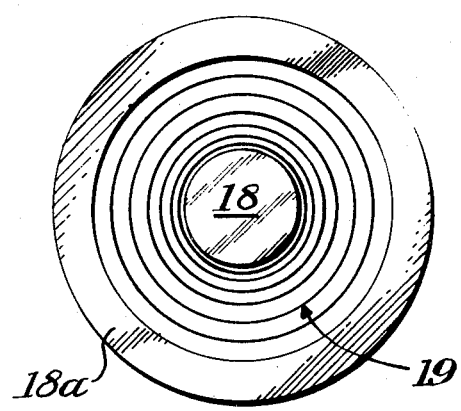

Once the film is deposited on a non-conducting base such as glass, two contact areas 13 and 13a are made on the "back" of the resistance film 12 (see FIG. 2). These contacts can be in the form of conducting epoxy mounts 13 and 13a which are attached directly to the filmed surface 12. Or alternatively, an additional "contact" layer, such as copper or silver paint can be deposited on the resistance film. Any screenable conductive paint may be used as a "contact", within the scope of this invention. Attachment may then be made directly to the copper or silver areas. In one embodiment, the copper contact layer or areas can be applied by depositing, as by sputtering or evaporation, the copper over the entire resistance film and then etching away undesired portions of the copper film; or the copper can be deposited on selected areas as by a masking process. In either event a relatively thin copper layer is required—a thickness of approximately one-half mil. If a silver paint is used instead, it may be deposited directly to the resistance film. One design for depositing the copper areas shows, in FIG. 3, one copper area 18 in the center of the resistance element of a circular mirror, and another area of copper 18a around the circumference of the resistance element.

When it is desired to make a mirror of circular configuration, and having copper contacts as described above, care must be exercised in depositing the resistance film 19 thereon, so that there is a higher density of the film in the center most portion of the circular configuration. The copper contact areas 18 and 18a may then be deposited thereon, necessitating a graded resistance from the center outward. This is essential in this type of a mirror to compensate for the higher current density produced by the radial current flow and to provide for a relatively even distribution of $I^2R$ or heating effect throughout the entire mirrored surface.

The resistance film is electrically connected to the automotive battery through the ignition switch, and provision is made for a thermostat to be attached on one of the contact areas. The thermostat is in electrical connection with the contact area being cemented thereto and the battery, and is provided to turn the "heater" off and on, since a defrosting type of rear-view mirror is only needed during cold weather. The thermostat is preferably a positive temperature coefficient of resistivity (PTCR) ceramic, although any small commercially available thermostat would be sufficient for the purposes of this invention. The PTCR ceramic is of the type describe by M. Kahn in the application assigned to the same assignee as this application, Ser. No, 28,143, and filed Apr. 13, 1970 and is cemented to the Nichrome V film. Such a unit undergoes a drastic change of resistance near some predetermined temperature, thereby serving as a thermostat herein. The ceramic can be made to undergo this drastic change of resistance at approximately 5°–10° C. or any particular desired temperature, causing any accumulation of snow, ice, frost, etc. to be defrosted because the resistance film will be heated at or below this temperature. Conversely, if the temperature does not fall this low, the thermostat will not be actuated, and the resistance film will not be heated as no current will flow therethrough.

The ceramic could be set to undergo this drastic change of resistance at a higher temperature, say 30° C. so as to keep the mirror free from any moisture on its surface. However, it would appear that 10° C. would be sufficient to produce a "defrosting" mirror. A PTCR ceramic is also preferred herein because it is not a "thermostat" in the strict sense of the word, and will actually give off some heat itself in the area surrounding the ceramic. Such a PTCR ceramic will have electrodes, such as a gallium-indium alloy for making further connections, thereto, and is composed of approximately 65% $BaTiO_3$, 35% $SrTiO_3$ and 0.15% $Nb_2O_5$ (in percent by weight), that is heat treated to a temperature and for a time sufficient to attain maximum grain boundary oxidation with a minimum of oxygen diffusion into the lattice, and cooling at a substantially uniform rate within the range of 500° F./hour to 50° F./hour to at least about 300° F. The physical dimensions of this ceramic would be approximately 1 by 1 inch, and approximately 40 mils thick.

Alternatively, the resistance film may be in contact with an automotive battery through the ignition switch, without the use of a thermostat, as this system's power drain need not be very high. In this arrangement, everytime the ignition switch is turned on, the resistance film is heated. Other optional connections include having the film in direct contact with the battery without going through the ignition switch. This would keep the mirror heated constantly, whether the automotive vehicle was in use or not, and would probably be quite unnecessary and impractical. Also, the resistance film could be connected to the battery through a thermostat. This arrangement would be somewhat more practical, because the mirror will only be heated in colder weather, but would not be solely dependent upon the ignition switch.

In either system, with or without a thermostat, about 25–30 watts of power is sufficient to provide the desired defrosting effect. A Nichrome V film should have a thickness of 300–400 A, to provide sufficient resistivity for the purposes of this invention.

The Nichrome V resistance film has an added feature or advantage in that the mirrored surface produced by it has sufficient reflectivity to serve as a mirror, but the reflectivity is not as high as, for example, aluminum, and consequently serves to reduce the glare therein. Such reduced reflectivity is especially advantageous in a rear-view mirror, in that it reduces the glare of headlights from cars following behind.

Figure 4:
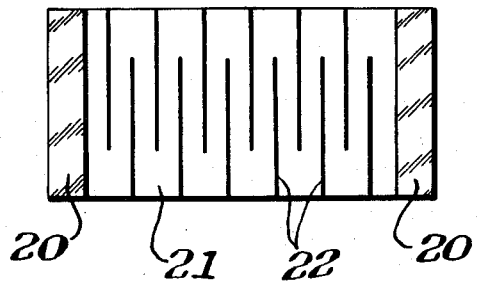
FIG. 4 shows a rectangularly shaped mirror having a typical meandered path of resistance film 21, and contact bars 20 on opposite ends thereof.

If more reflectivity is desired for the mirror than is provided by the Nichrome V surface, then a meandered aluminum film may be used in the alternative, as aluminum has a much higher reflectivity than the Nichrome V. When making round aluminum film mirrors, a meandering strip of aluminum is deposited on the glass in a spiral groove, giving very fine lines between the winds of aluminum that are hardly visible to the naked eye. This is done because aluminum is too conducting to get proper resistance, and long narrow strips become necessary for the purposes of this invention. In square or rectangularly shaped mirrors, as in FIG. 4, a long copper contact bar 20 at each end of the mirror will produce sufficient and evenly distributed heat. A typical meandered path of aluminum 21 is shown therein. Again, very fine lines between the winds of aluminum are hardly visible to the naked eye.

Since it is obvious that changes and modifications can be made in the above-described details without departing from the nature and spirit of the invention, it is

What is claimed is:

1. A mirror capable of being heated comprising a non-conducting base, a reflective resistance element said element being a nickel-chromium alloy resistance film covering continuously a major portion of at least one side of said base, said film having a low total resistance and reduced reflectivity, at least two conducting contact areas on said resistance film, said contact areas being in electrical connection with means for supplying electrical power to said resistance film so as to produce a heated surface.

2. The mirror of claim 1 wherein said contact areas are copper film deposits.

3. The mirror of claim 1 having a thermostat in electrical connection with said resistance film, with said power means and with a switch between said power means and said contact areas, said thermostat being actuated at a particular temperature or below same, causing current to flow through said resistance film.

4. The mirror of claim 3 wherein said thermostat is a positive temperature coefficient of resistivity ceramic.

5. The mirror of claim 3 wherein said resistance film is radially graded so that the thickest portion thereof is in the center of the non-conducting base.

6. The mirror of claim 3 wherein said non-conducting base is glass.

7. The mirror of claim 5 wherein one of said contact areas is a copper film deposit in the center of the resistance film, and the other contact area is a copper film around the outer surface of said resistance film.

8. The mirror of claim 6 wherein said mirror is located on an exterior portion of an automotive vehicle, and said power means and said switch are located within said automotive vehicle.

* * * * *